Nov. 25, 1969   F. FRITSCH   3,479,909
TOOTH GEARING WITH POWER DISTRIBUTION
Filed Dec. 12, 1967   2 Sheets-Sheet 1

INVENTOR.
Felix Fritsch
BY
Hood, Gherron & Evans
ATTORNEYS

Nov. 25, 1969    F. FRITSCH    3,479,909
TOOTH GEARING WITH POWER DISTRIBUTION
Filed Dec. 12, 1967    2 Sheets-Sheet 2

INVENTOR.
Felix Fritsch
BY Wood, Herron and Evans
ATTORNEY'S

United States Patent Office 3,479,909
Patented Nov. 25, 1969

3,479,909
TOOTH GEARING WITH POWER DISTRIBUTION
Felix Fritsch, Vienna, Austria, assignor to Simmering-Graz-Pauker Aktiengesellschaft fur Maschinen-, Kessel- und Waggonbau, Vienna, Austria
Filed Dec. 12, 1967, Ser. No. 689,875
Claims priority, application Austria, Feb. 15, 1967, A 1,459/67
Int. Cl. F16h 1/42
U.S. Cl. 74—714                    7 Claims

ABSTRACT OF THE DISCLOSURE

A power distribution system for transmitting power from a single input shaft over two or more transmission paths to two or more pinions which drive a single bull gear and attached output shaft. The transmission paths branch at an epicyclic gear train having a planet carrier and a ring gear, each of which is drivingly connected to one of the pinions.

This invention relates to a geared drive for power or torque transmission over two or more mechanical, non-adjustable power or torque passages or paths to a single gear. These paths each carry approximately the same or predetermined share or ratio of the transmission power from a single input shaft to a minimum of two pinions operable to drive a single output bull gear.

Power transmission over two parallel paths to a single bull gear is desirable for many heavy torque transmissions since it enables two or more small pinions to drive a single large gear. The weak link of a pinion to bull gear transmission is the pinion gear, the teeth of which are subject to breakage or wear in the event that design limitations are exceeded. Consequently, a whole transmission may be made smaller and lighter if multiple pinions may be made to transmit torque to the bull gear.

It has, therefore, been an objective of this invention to provide a transmission having plural drive pinions operable to drive a single bull gear and interconnected in such a fashion that each pinion transmits a predetermined portion of the load or torque to the ouput bull gear while simultaneously achieving a very high drive ratio, as for example a normal 6 to 1 ratio planetary gear will produce a 12 to 1 ratio between the input and output shafts when using a simple dual pinion drive.

Prior to this invention, dual path transmissions have been utilized for driving a bull gear from two or more pinion gears. When this has been attempted, the problem has always been to even the torque load to distribute it so that each pinion transmits torque to the bull gear without one pinion being forced to carry the full load. One way in which attempts have been made to overcome this problem has been by mounting either the input shaft or the output shaft on flexible or adjustable bearings or mountings so that the shafts could be moved relative to each other in order to preload all of the pinions. When the shafts are thus mounted on flexible or adjustable bearings, they require flexible couplings to connect the adjustable shafts with the remainder of the transmission or the machine driven by the transmission. The use of these flexible couplings is undesirable and disadvantageous for numerous reasons such as severe horsepower limitations, cost of manufacture and assembly, and severe limitations on design flexibility.

Another manner in which prior attempts have been made to accomplish power distribution in a dual path transmission has been by the use of helical gearing on the bull gear and the pinion gears. Load distribution in this type of transmission is accomplished by mounting at least one of the pinion shafts on floating bearings so that the helical pinions are self equalizing. For high gear ratios, the input pinions of this type of dual transmission are necessarily small so that the power capacity of the transmission is very limited or it is necessary to provide more input branches with consequent increase in the cost of the unit.

Another manner in which load equalization has been attempted in prior dual path transmissions has been by incorporating an elastic element or elastic material into the splines which drivingly connect the shafts of the gears of a dual path transmission. In this type of transmission, a gap is left between the male splines of the shaft and the female splines of the gear and this gap is filled with the elastic material, usually some form of rubber. The load equilization capability of this type of elastic drive is dependent upon the manufacturing accuracy of the splines. Since the accuracy cannot be perfect, part of the load capacity is never realized in this type of drive. Additionally, this type of drive is subject to excessive vibration and, if overloads of the flexible element occur, the load equilization feature is dissipated or it completely disappears. These disadvantages severely restrict the use of elastic load equilization elements in dual path transmissions.

Epicyclic gear trains have been used prior to this invention in special split torque transmissions but when so used, the purpose has been to achieve variable speed output from a constant speed input rather than load equalization. In these arrangements, power or torque output from the constant speed input shaft is selectively taken off of the input shaft and used to drive the ring gear of the epicyclic gear train. Variable speed of the output shaft is then achieved by varying the speed of the ring gear. This type of split torque unit is, strictly speaking, a regulating device rather than a power distribution transmission of the type in which a portion of the load is carried through two pinions to a single bull gear on the output shaft.

The familiar or conventional bevel gear differential has also been suggested as useable for dual path power distribution. When so used, the two input pinions must be used to split up the power and there is always some question whether the power is being divided up into two different mechanical flow paths. Irrespective of that question, the bevel gear differential isn't capable of accomplishing a satisfactory reduction in speed in addition to splitting of the power so as to be suitable for dual path transmission use.

In basic oxygen furnace tilting drives, spur gear differentials are commonly used to divide the power onto two input pinions. A spur gear differential has the same properties of load distribution and speed reduction as the bevel gear differential so that it is less than an optimal solution to the problem of load distribution and speed reduction. It is also an expensive transmission.

The invention of this application is predicated upon the concept of obtaining equal or predetermined power or torque distribution onto two or more input pinions operable to drive a single bull gear by dividing the power input to the pinions through an ingenious power branch formed by an epicyclic gear train. The planet carrier and the ring gear of the epicyclic gear train are both operable to drive one of the pinion gears in such a manner that a large speed reduction is accomplished simultaneously with power or torque load distribution.

The advantage of this particular dual path transmission is that it enables all of the shafts to be rigidly mounted since the loads are automatically equalized or the torque split so as to get predetermined loading of the pinions which drive the bull gear. The epicyclic gear train can be built very compactly because of the number of planetary gears in the gear train in comparison to the number of pairs of spur gears in a parallel shaft drive. Thus, it is possible to obtain very large speed reductions or ratio changes in a small amount of space. The gear ratio of the epicyclic gear train is doubled owing to the interaction of the ring gear and a second gear. For example, a 6 to 1 ratio epicyclic gear drive (ratio input gear rotation to output planetary gear carrier rotation) accomplishes a 12 to 1 speed reduction (ratio or sun gear rotation to output pinion gear rotation) when used in the novel split or dual path transmission of this invention. The second spur gear which is driven by the ring gear of the epicyclic gear train has a ratio of nearly 1:1 with the ring gear. This second gear may be built with a finer pitch and therefore is relatively small and light so that it is possible to build strong high torque drives and incorporate high speed reduction ratios into the dual path transmission of this invention.

These and other objects and advantages of this invention will be more readily apparent from the following detailed description of the drawings in which.

Figure 1:
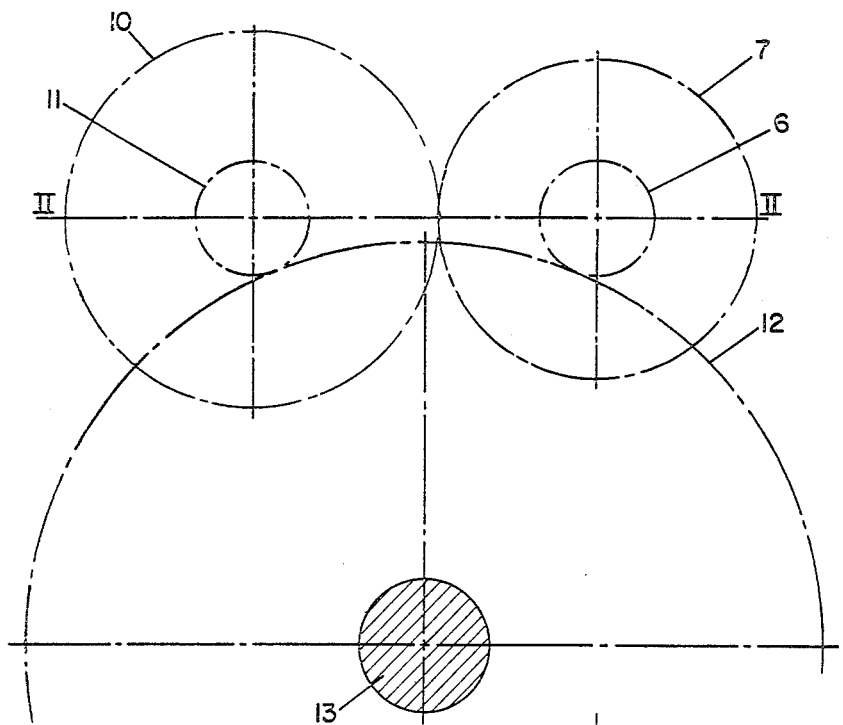
FIGURE 1 shows a view in schematic detail of the overall construction of one preferred type of dual path transmission drive incorporating the invention of this application.
Figure 2:
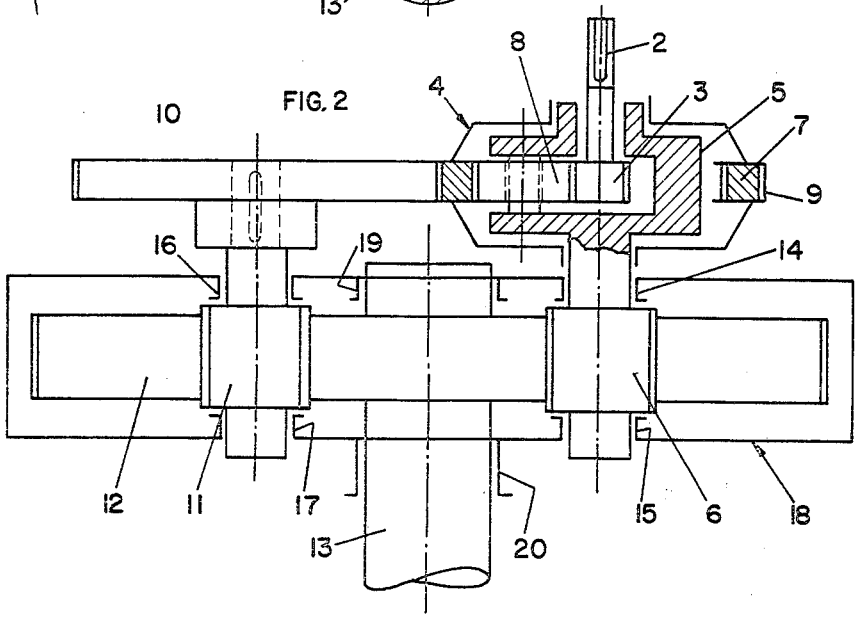
FIGURE 2 is a section view along the line 2—2 of FIGURE 1.

In the gear drive according to FIGURES 1 and 2, the input power is delivered by an input shaft 2 to the sun pinion 3 of an epicyclic gear train 4 which has a planetary carrier 5 with a pinion 6 rigidly mounted to it. A ring gear 7 is rotatably mounted upon the planetary carrier 5. This ring gear 7 is driven by planet gears 8 in an opposite direction of rotation than the planet carrier. The ring gear 7 transmits power to its outer external gear 9. This external gear 9 drives a gear 10 which has a second pinion 11 mounted rigidly on its shaft. Both pinions 6 and 11 mesh with a bull gear 12 mounted on output shaft 13. The pinions 6 and 11 are mounted on bearings 14 through 17 in the housing 18 which also has output shaft 13, bearings 19 and 20 mounted on it in this example.

In order that pinions 6 and 11 can carry the same amount of torque, it is necessary that the ratio of rotation between sun pinion 3 and pinions 6 be equal to the ratio between sun pinion 3 and pinion 11. Hence the gear ratio between the external gear on ring gear 9 and the gear 10 is necessarily small and often is close to 1. For example, for a given epicyclic gear ratio of 6:1 (ratio of rotation of sun gear to planetary carrier) the external gear 9 to spur gear 10 ratio required is 1.2:1 and the ratio between the sun gear and the two pinion gears 6 and 11 is 12:1. The drive continues to function even in the case where the ratio of external gear 9 to gear 10 is slightly different than the value of 1.2:1 but then unequal parts of the power or torque are carried through the power branches to pinions 6 and 11.

The design construction according to FIGURES 1 and 2 depicts a rather simple arrangement of the invention. It is possible to insert other gear reduction stages between pinions 6 and 11 and the bull gear 12. These insertions, of course, do not impair the effectiveness of the invention. It is also possible to insert other gear reduction stages before the input shaft 2.

Figure 3:
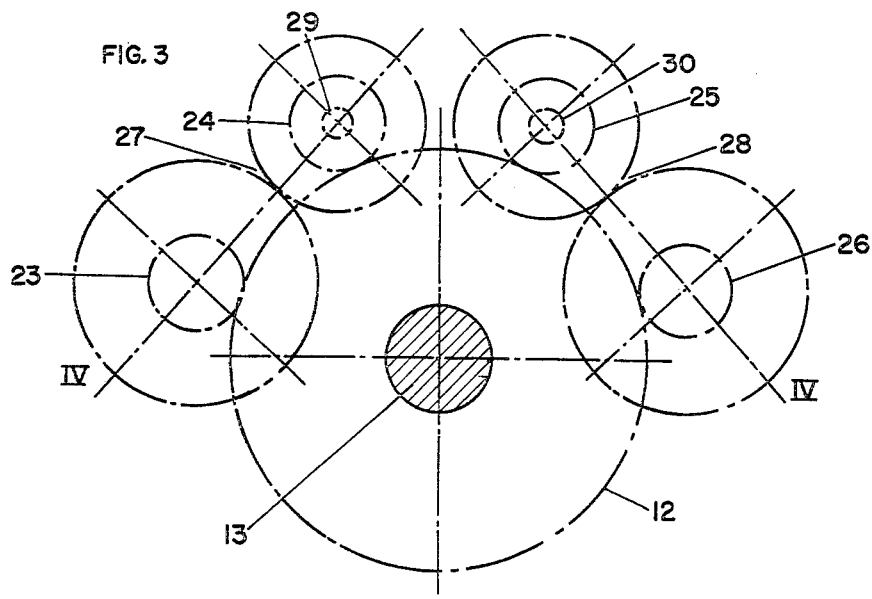
FIGURE 3 shows a view in schematic detail of the overall construction of a second preferred type of dual path transmission drive incorporating the invention of this application.
Figure 4:
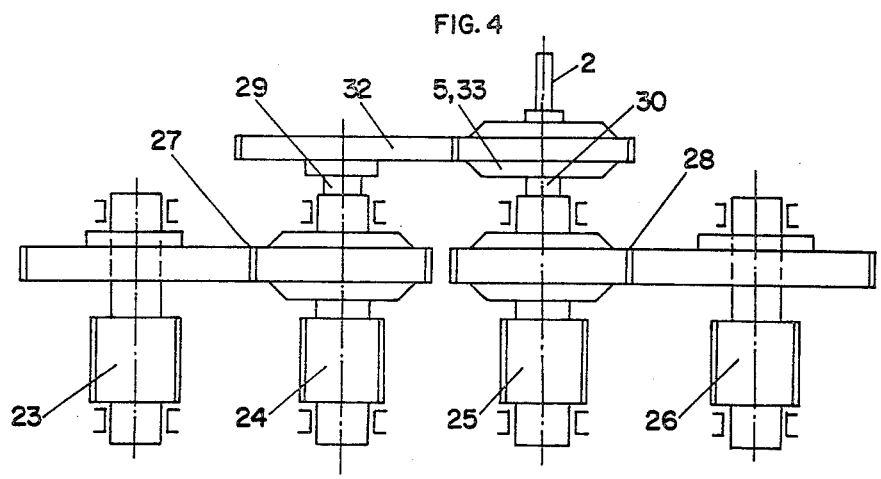
FIGURE 4 is a section view along the line 4—4 of FIGURE 3.

Very heavy drives are possible. Such a drive is shown in FIGURES 3 and 4 where multiple power branches are combined in the following way. In this design example, four pinions 23 through 26 mesh with bull gear 12. Pinions 23 and 24 are powered by dual path epicyclic gear 27. Pinions 25 and 26 are powered by a similar epicyclic gear 28. The input shafts 29 and 30 to these drives are connected to a gear 32 and a planet carrier 5 of a third epicyclic gear 33. Thus, the power from input shaft 2 is divided up evenly among the four pinions 23 through 26.

Details and combinations other than described in this patent application can be easily adapted to the actual power, ratio or construction required. For example, it would be possible for gear 10 to mesh with a gear mounted on the planet carrier 5 and to connect the ring gear 7 with pinion 6 which is a reversal of the construction described in FIGURES 1 and 2. Other modifications and changes which may be made without departing from the spirit of my invention will be readily apparent to those persons skilled in the arts to which my invention pertains. Therefore, I do not intend to be limited except by the scope of the appended claims.

Having described my invention, I claim:

1. A dual path transmission for transmitting power from a single input shaft via at least two power transmitting paths to a single output bull gear, said transmission comprising at least two pinions drivingly contacting the teeth of said single output bull gear, an epicyclic gear train interconnecting said two power transmission paths, said epicyclic gear train including a ring gear element and a planetary gear carrier element, and means drivingly connecting each of said elements to one of said pinions.

2. The dual path transmission of claim 1 wherein said ring gear element has external gear teeth operable to drive a second gear, said second gear being drivingly connected to one of said pinions.

3. The dual path transmission of claim 2 wherein the other of said pinions is drivingly connected to said planet gear carrier.

4. The dual path transmission of claim 1 wherein both of said power transmitting paths comprises at least one planetary gear of the epicyclic gear train.

5. The dual path transmission of claim 1 wherein said epicyclic gear train includes a sun gear and at least one planet gear, said planet gear being connected to said planet gear carrier by a shaft, said sun gear being driven from said single input shaft and operable to drive the planet gear carrier through said planet gear and planet gear shaft.

6. The dual path transmission of claim 1 wherein said pinions and said bull gear are all supported upon fixed, non-adjustable shafts, and the gear ratio between said input shaft and said two pinions is such that the torque load on said pinions is approximately equal.

7. A multiple path transmission for transmitting power from a single input shaft via four power transmitting paths to a single output bull gear, said transmission comprising four pinions drivingly contacting the teeth of said single bull gear, three power distribution systems interconnecting said four power transmission paths, two of said power distribution systems being drivingly connected to said four pinions and being interconnected by the third power distribution system, each of said power distribution systems including an epicyclic gear train, said epicyclic gear trains each including a ring gear element having an external gear secured thereto and a planetary gear carrier element, and means drivingly connecting all of said elements to one of said pinions.

References Cited
UNITED STATES PATENTS

| | | | |
|---|---|---|---|
| 3,033,057 | 5/1962 | Gray | 74—674 |
| 3,106,855 | 10/1963 | Reichenbaecher | 74—705 |
| 3,316,772 | 5/1967 | Jones | 74—410 |
| 3,390,585 | 7/1968 | Henne | 74—410 |
| 3,397,591 | 8/1968 | Delescluse | 74—410 |

LEONARD H. GERIN, Primary Examiner

U.S. Cl. X.R.

74—410, 715, 801